W. R. BOONE.
AGRICULTURAL IMPLEMENT.
APPLICATION FILED DEC. 14, 1918.
1,316,676.
Patented Sept. 23, 1919.
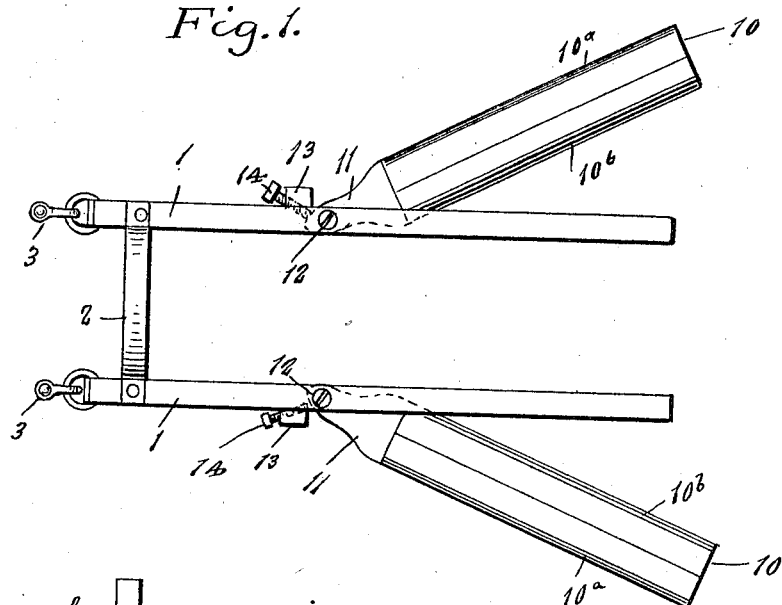
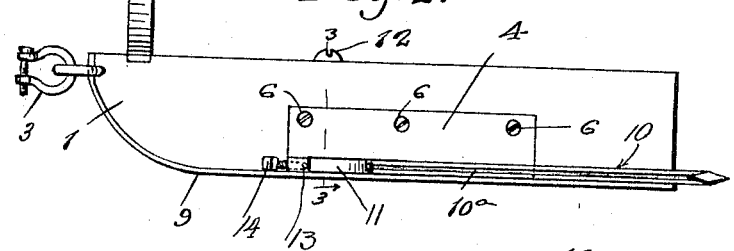
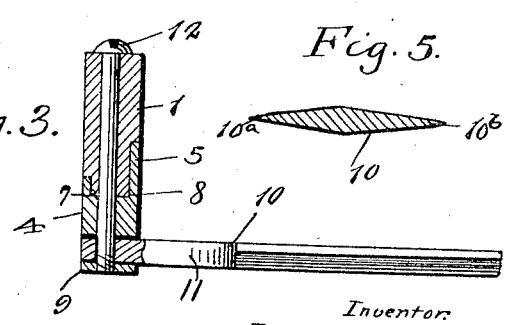
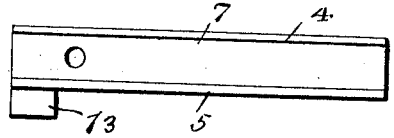
Inventor:
W. R. Boone.
By *[signature]*
Attorney.

UNITED STATES PATENT OFFICE.

WALLIE R. BOONE, OF WHITEFLAT, TEXAS.

AGRICULTURAL IMPLEMENT.

1,316,676.     Specification of Letters Patent.     Patented Sept. 23, 1919.

Application filed December 14, 1918. Serial No. 266,740.

*To all whom it may concern:*

Be it known that I, WALLIE R. BOONE, a citizen of the United States, residing at Whiteflat, in the county of Motley and State of Texas, have invented certain new and useful Improvements in Agricultural Implements; and I do hereby declare the following to be a full, clear, and exact description of the invention, such as will enable others skilled in the art to which it appertains to make and use the same.

This invention relates to agricultural implements, and more particularly to an implement for destroying weeds and other noxious plants by cutting the same.

One of the main objects of the invention is to provide an implement of the character stated of simple construction and operation employing spaced supporting runners adapted to pass on opposite sides of a row of plants, these runners being provided with outwardly projecting cutting members for cutting the weeds between adjacent rows of plants.

A further object is to provide simple and efficient means whereby the cutting knives may be readily adjusted so as to vary their effective cutting width to accommodate variations in the distance between rows of plants.

A further object is to provide simple and efficient adjusting means for the cutting knives which may be readily applied to an implement of this type, commonly known as "go-devils," without necessitating any material changes in the construction of the implement itself.

Further objects will appear from the detailed description.

In the drawings:

Figure 1 is a top plan view of a go-devil with knife adjusting means constructed in accordance with my invention applied.

Fig. 2 is a side view.

Fig. 3 is a section taken substantially on line 3—3 of Fig. 2.

Fig. 4 is a detail plan view of the casting for supporting the knife and the setting screw therefor.

Fig. 5 is a transverse sectional view through one of the cutting knives.

The frame of the implement comprises two spaced runners 1 which are held in spaced relation and in parallelism by a connecting bow 2 secured thereto. Each of these runners is provided at its forward end with a clevis 3 by means of which traction attaching means may be readily secured to the runners for pulling the same along a row of plants, one runner being positioned at each side of the row and closely adjacent thereto. This implement constructed in this manner is well known and forms no part of my invention, except in so far as it coöperates with the means to be described of accomplishing the desired results.

A supporting member or casting designated generally by 4 is secured to the outer face of each runner 1, this casting being provided with a lateral flange 5 through which are inserted securing screws 6 threaded into the body of the runner. The casting is further provided with a central U-shaped socket 7 which receives a corresponding rib 8 provided on the lower edge portion of the runner, and a metallic strip or shoe 9 is secured to the lower edge of the runner, as shown.

A cutting knife designated generally by 10 has its inner end portion reduced and shaped to provide a substantially semi-elliptical element 11 which is provided with a central opening which receives the lower end portion of a securing bolt 12 inserted through runner 1 and socket member 7 of the casting 4, this bolt being passed through element 11 of the knife and screwed into shoe 9 of the runner which is provided with a threaded opening for this purpose. In this manner, the knife is secured to the runner so as to be rockable about a vertical axis, this knife projecting laterally of the runner so as to engage weeds and noxious plants positioned to one side of the row of plants along which the implement is drawn. As will be noted more clearly from Fig. 4, casting 4 is provided on its outer face with an angularly disposed lug 13 which is bored and threaded to receive a set screw 14. This lug is positioned so that the set screw may be turned into engagement with the element 11 of the knife inside of the axis of bolt 12 so as to adjust this knife about the bolt and vary its angle to the runner. By turning the set screw inwardly, the outer end of the knife will be moved in an arc in such direction as to bring the knife into a position substantially at a right angle to the runner. When in this position, the knife will cut weeds and noxious plants over a relatively wide strip or space as the implement is drawn along the row of plants. By varying the adjustment of the knife, the width of the strip cut may be varied to suit circumstances, as will be understood. When thus adjusted, the knife is held securely against rearward movement by the set screw 14 and the bolt 12.

As will be noted more clearly from Fig. 5, the body of the knife tapers in thickness toward each edge from its central line so as to provide two oppositely directed cutting edges 10$^a$ and 10$^b$. When the forward cutting edge 10$^a$ becomes worn or dull, the knife may be readily detached from the runner by removing bolt 12 and reversed so as to have the unused cutting edge 10$^b$ directed forwardly, after which the knife is secured in position in the manner previously described. This construction provides two cutting edges for the knife, and the mounting of this knife is such as to permit ready reversal thereof in the manner described.

It will be evident that there may be slight changes made in the construction and arrangement of the details of my invention without departing from the field and scope of the same, and I intend to include all such variations, as fall within the scope of the appended claims, in this application in which a preferred form only of my invention is disclosed.

What I claim is:

1. In an implement of the character stated, a runner, a casting carried thereby and provided with a socket for receiving the end portion of a cutting blade, a cutting blade having its end portion inserted into said socket and pivotally secured therein for rocking movement about a vertical axis, and means carried by the casting for engaging said blade inside of the pivotal axis thereof for adjusting the blade about its axis of movement.

2. In an implement of the character stated, a runner provided with a recess in its lower edge portion and a shoe extending across said recess, a casting secured to said runner and provided with a socket member fitting into the recess thereof, a cutting blade projecting into the socket member of the casting above the shoe of the runner and provided with an opening for reception of a securing bolt, a securing bolt passed through said runner and socket member, said bolt being extended through the blade and the shoe of the runner so as to pivotally secure the blade to the runner for adjustment about a vertical axis, and a set screw carried by said casting and positioned to engage the end portion of the blade inside of the axis of said bolt so as to adjust the blade outwardly from the runner about the axis of the bolt.

In testimony whereof I affix my signature in presence of two witnesses.

WALLIE R. BOONE.

Witnesses:
T. C. BOURLAND,
OSCAR FULKERSON.

Copies of this patent may be obtained for five cents each, by addressing the "Commissioner of Patents, Washington, D. C."